United States Patent
Webber et al.

(10) Patent No.: US 12,429,355 B2
(45) Date of Patent: Sep. 30, 2025

(54) MINING MAP DATA TO PREDICT TURN RESTRICTIONS

(71) Applicant: MICROSOFT TECHNOLOGY LICENSING, LLC, Redmond, WA (US)

(72) Inventors: Ivan Webber, Redmond, WA (US); Marius Alexandru Marin, Bellevue, WA (US); Albert Tamazyan, Seattle, WA (US); Ming Tan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 18/119,199

(22) Filed: Mar. 8, 2023

(65) Prior Publication Data
US 2024/0302181 A1 Sep. 12, 2024

(51) Int. Cl.
*G01C 21/00* (2006.01)
*G06F 16/26* (2019.01)
(Continued)

(52) U.S. Cl.
CPC ..... *G01C 21/3833* (2020.08); *G01C 21/3815* (2020.08); *G06F 16/26* (2019.01);
(Continued)

(58) Field of Classification Search
CPC . G01C 21/3833; G01C 21/3815; G06F 16/26; G06N 20/20; G06V 10/70; G06V 20/176
See application file for complete search history.

(56) References Cited

U.S. PATENT DOCUMENTS

| 10,030,990 B2 * | 7/2018 | Lynch | G09B 29/007 |
| 2011/0191033 A1 * | 8/2011 | Sandvad | F03D 80/50 |
| | | | 702/33 |

(Continued)

FOREIGN PATENT DOCUMENTS

| CN | 108961758 B | 2/2021 |
| CN | 114170797 A | 3/2022 |

OTHER PUBLICATIONS

"Create Protected Pdfs from Office Files", Retrieved From: https://support.microsoft.com/en-us/topic/create-protected-pdfs-from-office-files-aba7e367-e482-49e7-b746-a385e48d01e4, Nov. 10, 2022, 4 Pages.

(Continued)

*Primary Examiner* — Redhwan K Mawari
(74) *Attorney, Agent, or Firm* — Newport IP, LLC; Jacob P. Rohwer

(57) ABSTRACT

Disclosed herein is a system for mining map data to automatically identify and/or predict turn restrictions. The systems uses street-level imagery to recognize and locate posted signs (e.g., physical signs, electronic signs) that signal, or are in some way related to, a turn restriction at an intersection. Then, the techniques use a cascade of machine learning models to accurately predict whether the recognized and located signs impose the turn restriction at the intersection. Consequently, the human effort required to identify turn restrictions is greatly decreased, if not completely eliminated. Furthermore, electronic maps can more efficiently be expanded and/or updated which improves the experience for vehicle drivers that reply upon the electronic maps for directions from original locations to destination locations.

20 Claims, 8 Drawing Sheets

(51) Int. Cl.
  *G06N 20/20* (2019.01)
  *G06V 10/70* (2022.01)
  *G06V 20/10* (2022.01)

(52) U.S. Cl.
  CPC ............. *G06N 20/20* (2019.01); *G06V 10/70* (2022.01); *G06V 20/176* (2022.01); *G06V 20/182* (2022.01)

(56) References Cited

U.S. PATENT DOCUMENTS

| | | | |
|---|---|---|---|
| 2012/0007185 A1* | 1/2012 | Yin ...................... | H10D 62/235 438/300 |
| 2014/0143184 A1* | 5/2014 | Koukoumidis ...... | G09B 29/106 706/12 |
| 2016/0133044 A1* | 5/2016 | Lynch ................... | G06T 19/003 382/284 |
| 2016/0356609 A1* | 12/2016 | Dorum ................... | G01C 21/34 |
| 2020/0189575 A1* | 6/2020 | Wongpiromsarn ......................... | B60W 30/095 |
| 2020/0202167 A1* | 6/2020 | Gross ..................... | G06V 10/87 |
| 2021/0072039 A1* | 3/2021 | Shin ....................... | G06N 3/044 |
| 2022/0048186 A1* | 2/2022 | Sharma ............... | G06F 11/3006 |
| 2022/0058403 A1* | 2/2022 | Huang .................... | G06F 18/24 |
| 2023/0222332 A1* | 7/2023 | Mahendran ............ | G06N 3/045 706/25 |

OTHER PUBLICATIONS

Galaktionov, et al., "Navigational Rule Derivation: An Algorithm To Determine The Effect Of Traffic Signs On Road Networks", In Repository of arXiv:1611.06108, Nov. 17, 2022, 12 Pages.

Sheng, et al., "Learning-based Road Crack Detection Using Gradient Boost Decision Tree", In Proceedings of 13th IEEE Conference on Industrial Electronics and Applications, May 31, 2018, pp. 1228-1232.

\* cited by examiner

MINING MAP DATA TO PREDICT TURN RESTRICTIONS

BACKGROUND

Today, drivers of vehicles (e.g., cars, trucks, motorcycles, bicycles) can easily access an electronic map via an available device (e.g., a smart phone, a vehicle console device) and in a safe manner to obtain turn-by-turn directions from an original location to a destination location. However, the electronic map does not accurately capture, convey, and ultimately present turn restrictions imposed at intersections. Turn restrictions are important aspects of electronic maps that are imposed by legal and/or physical means. For example, a turn restriction is imposed when it is illegal for a driver of a vehicle to turn from one street onto another street. In another example, a turn restriction is imposed when a street is impassible due to a permanent or temporary physical barrier.

Electronic maps are typically composed using fleets of vehicles and a large number (e.g., thousands) of human mapmakers that manually review Global Positioning System (GPS) traces reported from the vehicles, as well as street-level imagery. The human mapmakers can then define aspects of the electronic maps to reflect what is manually seen via the GPS traces and the street-level imagery. However, this typical approach is costly and imperfect when used for turn restrictions because turn restrictions are not common. For instance, a turn restriction is generally only imposed in one out of one thousand intersections.

Accordingly, the human effort required to review each intersection in an electronic map and to identify a turn restriction does not sufficiently scale as the electronic map expands to new geographic regions and intersections and/or as new turn restrictions are imposed in existing geographic regions and intersections. This ultimately results in an electronic map with missing turn restrictions. Missing turn restrictions in an electronic map can result in illegal routes (e.g., an illegal turn) that lead to citations or fines. Or even worse, missing turn restrictions in an electronic map increase the likelihood of a collision (e.g., between two vehicles, between a vehicle and a pedestrian) that can cause bodily harm. It is with respect to these and other considerations that the disclosure made herein is presented.

SUMMARY

The techniques disclosed herein implement a system that mines map data to automatically identify and/or predict turn restrictions. The techniques use street-level imagery to recognize and locate posted signs (e.g., physical signs, electronic signs) that signal, or are in some way related to, a turn restriction at an intersection. Then, the techniques use a cascade of machine learning models to accurately predict whether the recognized and located signs impose the turn restriction at the intersection. Consequently, the human effort required to identify turn restrictions is greatly decreased, if not completely eliminated. Furthermore, electronic maps can more efficiently be expanded and/or updated which improves the experience for vehicle drivers that reply upon the electronic maps for directions from original locations to destination locations.

As described herein, the system is configured to access map data. The map data includes street geometry (e.g., a layout of streets) and street-level (i.e., street-side) imagery. The map data can be publicly available data or private data that is not available to the general public. The street-level imagery includes a large number (e.g., thousands, hundreds of thousands) of images. In one example, the images are obtained via a 360 degree panoramic camera fixed on top of a vehicle tasked with driving around a geographic region (e.g., a neighborhood, a town, a city, a county, a state, a country) to generate the street-level imagery. Additionally or alternatively, the images can be obtained from other types of source cameras used for different scenarios (e.g., traffic cameras used for monitoring and surveillance, vehicle dashboard cameras).

The system reviews the street geometry included in the map data to identify an intersection. An intersection is a point in the street geometry where at least three navigable edges meet. Accordingly, a driver of a vehicle on one of the navigable edges that is approaching the intersection must select another navigable edge, from multiple other navigable edges, on which to continue driving. At least one of the other navigable edges would require a turn from one street onto another street. In some examples, one of the other navigable edges is the same street the driver is currently on (e.g., the driver may decide to continue going straight through the intersection on the same street).

After the system identifies the intersection, the system defines a turn maneuver from a first navigable edge included in the intersection onto a second navigable edge included in the intersection. Generally, a turn maneuver is agnostic to a direction of travel and/or a street to which the first navigable edge and the second navigable edge belong. To illustrate, a turn maneuver can include a situation where the first navigable edge and the second navigable edge are the same street and/or a driver may attempt to continue to go straight through an intersection. The techniques described herein apply to this situation because going straight through the intersection may be restricted, e.g., via a "Do Not Enter" sign, a "Must Turn" sign, etc.

After the turn maneuver is defined, the system identifies a first turn maneuver image amongst the images included in the map data. The first turn maneuver image is identified to provide a perspective from an approach to the intersection on the first navigable edge. Accordingly, the system can be configured to use location metadata (e.g., Global Positioning System (GPS) coordinates) associated with the street-level imagery to identify and select an image that is captured when a camera is located a predefined distance (e.g., fifteen meters) away from the intersection. Consequently, the camera that captures the first turn maneuver image is not located within the intersection. This first turn maneuver image is important to determining whether a turn restriction is imposed because if a turn restriction is imposed then transportation agencies and/or departments typically place a street-side sign that alerts drivers to the turn restriction as vehicles approach the intersection.

The system also identifies a second turn maneuver image amongst the images included in the map data. The second turn maneuver image is identified to provide a perspective from within the intersection. Accordingly, the system can be configured to use the location metadata associated with the street-level imagery to identify and select an image that is captured when a camera is located closest to a center of the intersection. This second turn maneuver image is important to determining whether a turn restriction is imposed because if a turn restriction is imposed then transportation agencies and/or departments typically place an additional sign that further alerts drivers to the turn restriction as the vehicle is entering and/or driving through the intersection.

Now that the system has identified two important images related to the turn maneuver, the system is configured to recognize signs in the two images. In one example, the system is trained to implement a bounding box recognition approach that locates a portion of an image that includes a sign and then determines a type of the sign. The type of the sign reflects the information the sign is intending to convey to drivers. Accordingly, the bounding box recognition approach considers a shape of the sign, a color of the sign, a shape of a graphic illustrated on the sign, a color of a graphic illustrated on the sign, and/or word(s) written on the sign. In one example, the system is trained to recognize meaningful signs. A meaningful sign is one that relates to traffic flow, which implies a potential relation to a turn restriction being imposed on the turn maneuver at the intersection. In contrast, an example of an unmeaningful sign is a street name sign or a speed limit sign, and unmeaningful signs can be ignored. Stated alternatively, unmeaningful signs are not recognized and thus disambiguate from meaningful signs which should be used in the cascade of machine learning models.

Once the system has recognized the signs (e.g., the recognition reflects the types of signs and/or the information the sign is intending to convey to drivers) in the first turn maneuver image and the second turn maneuver image, the system provides the recognized signs as input parameters to a first machine learning model in the cascade of machine learning models. The first machine learning model is trained to determine (e.g., calculate) a score for each sign recognized in the first turn maneuver image and the second turn maneuver image. The score indicates a level of confidence that a corresponding sign imposes the turn restriction on the turn maneuver at the intersection. The scores for the recognized signs are the output parameters for the first machine learning model.

In one example, the first machine learning model is trained to determine the score for a sign based on (i) a first prediction of whether the sign, when considered alone or by itself, imposes the turn restriction and (ii) a second prediction based on whether multiple signs (e.g., all the recognized signs provides as input parameters), when considered as an aggregate, impose the turn restriction. Consequently, the first machine learning model can be referred to as a two-stage model.

The system is configured to take the scores for the recognized signs, which are the output parameters for the first machine learning model, and provide them as input parameters to a second machine learning model in the cascade of machine learning models. As described above, the system uses the cascade of machine learning models to improve the accuracy at which turn restrictions can be identified. Accordingly, the second machine learning model is configured to improve the accuracy of the scores determined using the first machine learning model.

In addition to the scores determined for the recognized signs, the system provides a location and/or an orientation for a recognized sign as input parameters to the second machine learning model. The location and/or an orientation for a recognized sign can be determined after execution of the first machine learning model. The second machine learning model is trained to adjust (e.g., recalculate) the score determined by the first machine learning model for each sign recognized in the first turn maneuver image and the second turn maneuver image based on the location and/or the orientation of the sign. The second machine learning model is further trained to predict, based on the adjusted scores, whether the turn restriction is imposed on the turn maneuver. The prediction is the output parameter for the second machine learning model.

Similar to the discussion above with respect to the first machine learning model, the second machine learning model can be trained to adjust the score for a sign based on (i) a first prediction of whether the location and/or the orientation of the sign, when considered alone or by itself, imposes the turn restriction and (ii) a second prediction based on whether the locations and/or the orientations of multiple signs (e.g., all the recognized signs), when considered as an aggregate, impose the turn restriction. Consequently, the second machine learning model can also be referred to as a two-stage model.

The first machine learning model and/or the second machine learning model can be any one of various predictive models. In one example, the first machine learning model and/or the second machine learning model is a gradient-boosted decision tree (GBDT) model.

The system is configured to identify a number of "intersection" images (e.g., one, two, three, four, five, ten) amongst the images included in the map data. The system uses the intersection images to determine the locations and/or orientations of the signs recognized in the first turn maneuver image and the second turn maneuver image. As described above, the locations and/or orientations of the signs recognized in the first turn maneuver image and the second turn maneuver image are inputs parameters to the second machine learning model. An intersection image is one that captures at least one of the signs recognized in the first turn maneuver image and the second turn maneuver image from a different perspective (e.g., a different camera location). Accuracy in detecting the location and/or orientation of a recognized sign improves when the recognized sign is captured in images from different perspectives (e.g., different angles). Therefore, the intersection images are used to more accurately locate and/or orient the recognized signs with respect to a baseline location (e.g., the center of the intersection). Stated alternatively, the intersection images provide an improved understanding of exactly how the recognized signs are positioned with respect to the intersection and/or the turn maneuver being evaluated. In this context, the baseline location and/or the camera locations are included in the map data and can be GPS coordinates, for example.

The system uses a computer vision (CV) model to identify and locate common (e.g., aligned) points on a recognized sign from various images. The various images can include both turn maneuver images and intersection images. Alternatively, the various images can include only intersection images (e.g., without the first or second turn maneuver images). A common point on a recognized sign is determined based on an intersection of trajectories (e.g., light rays) projected onto image planes. More specifically, the common point is projected onto respective image planes through the cameras' focal points resulting in separate points on the respective image planes. Since the geometry (e.g., locations and/or orientations) of the cameras is known, the trajectories that intersect at the common point can be determined and linear algebra can be used to accurately calculate the location and/or the orientation of a common point on the recognized sign in the real world. By association, the location and/or orientation of the recognized sign can be determined. In various examples, the location and/or orientation of the recognized sign is transformed into a format that is relative to a baseline location associated with the intersection (e.g., a vector that captures a distance from the baseline location and an angle—or azimuth—based on a spherical coordinate system established based on the baseline location).

Consequently, the system described herein can automatically (e.g., without manual review and/or user input) and accurately predict when a turn restriction is imposed on a turn maneuver at a high precision (e.g., over 90% of the time). In turn, this greatly reduces the required human effort typically needed to identify a turn restriction. The prediction of the turn restriction can then be provided such that the map data is updated with the turn restriction. The updated map data can be provided to (e.g., downloaded by) an available device (e.g., a smart phone, a vehicle console device) in the form of turn-by-turn directions from an original location to a destination location.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for mining map data to automatically identify and/or predict turn restrictions. The techniques and technologies use street-level imagery to recognize and locate posted signs (e.g., physical signs, electronic signs) that signal, or are in some way related to, a turn restriction at an intersection. Then, the techniques use a cascade of machine learning models to accurately predict whether the recognized and located signs impose the turn restriction at the intersection. Consequently, the human effort required to identify turn restrictions is greatly decreased, if not completely eliminated. Furthermore, electronic maps can more efficiently be expanded and/or updated which improves the experience for vehicle drivers that reply upon the electronic maps for directions from original locations to destination locations. Various examples, scenarios, and aspects are described below with reference to FIGS. 1-6.

Figure 1:
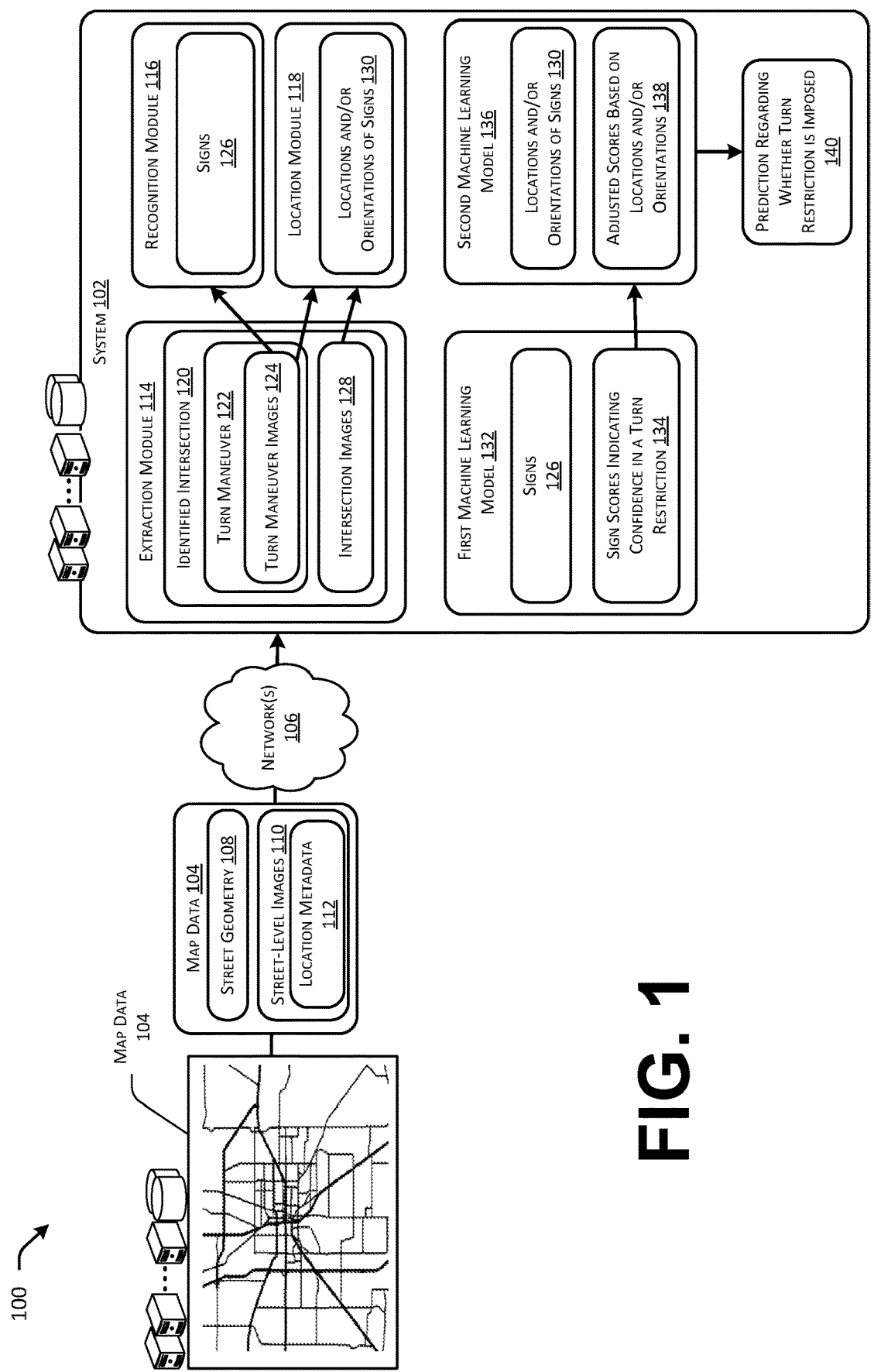
FIG. 1 illustrates an example environment in which a system is configured to mine map data to automatically identify and/or predict turn restrictions.

FIG. 1 is a diagram illustrating an example environment 100 in which a system 102 is configured to mine map data 104 to automatically identify and/or predict turn restrictions. In various examples, device(s) of the system 102 can include one or more computing devices that operate in a cluster or other grouped configuration to share resources, balance load, increase performance, provide fail-over support or redundancy, or for other purposes. For instance, device(s) of the system 102 can be server-type devices. The device(s) of the system 102 can also include network interface(s) to enable communications between device(s) over network(s) 106.

The system 102 is configured to access the map data 104 via the network(s) 106 or via local storage. The map data 104 includes street geometry 108 (e.g., a layout of streets) for various geographic regions (e.g., neighborhoods, towns, cities, counties, states, provinces, countries) and street-level (e.g., street-side) images 110. The street-level images 110 include location metadata 112 (e.g., Global Positioning System (GPS) coordinates) useable to associate a street-level image with a particular location (e.g., an intersection) in the street geometry 108.

The map data 104 can be publicly available data or private data that is not available to the general public. The street-level images 110 can include a large number (e.g., thousands, hundreds of thousands) of images. In one example, the street-level images 110 are obtained via a 360 degree panoramic camera fixed on top of a vehicle tasked with driving around a geographic region to capture street-level characteristics including signs. Additionally or alternatively, the street-level images 110 can be obtained from other types of source cameras used for different scenarios (e.g., traffic cameras used for monitoring and surveillance, vehicle dashboard cameras).

As described herein, the system includes an extraction module 114, a recognition module 116, and a location module 118, each of which is discussed in more detail below. The number of illustrated modules in FIG. 1 is just an example, and the number can vary. That is, functionality described herein in association with the illustrated modules can be performed by a fewer number of modules or a larger number of modules on one device or spread across multiple devices.

The extraction module 114 is configured to review the street geometry 108 included in the map data 104 to identify, or extract, an intersection 120. An intersection 120 is a point in the street geometry 108 where at least three navigable edges meet. Accordingly, a driver of a vehicle on one of the navigable edges that is approaching the intersection 120 must select another navigable edge, from multiple other navigable edges, on which to continue driving. At least one of the other navigable edges would require a turn from one street onto another street. In some examples, one of the other navigable edges is the same street the driver is currently on (e.g., the driver may decide to continue going straight through the intersection on the same street).

After the extraction module 114 identifies the intersection 120, the extraction module 114 defines a turn maneuver 122 from a first navigable edge included in the intersection 120 onto a second navigable edge included in the intersection 120. Generally, a turn maneuver 122 is agnostic to a direction of travel and/or a street to which the first navigable edge and the second navigable edge belong. To illustrate, a turn maneuver 122 can include a situation where the first navigable edge and the second navigable edge are the same street and/or a driver may attempt to continue to go straight through an intersection. The techniques described herein apply to this situation because going straight through the intersection may be restricted, e.g., via a "Do Not Enter" sign, a "Must Turn" sign, etc.

After the turn maneuver 122 is defined, the extraction module 114 identifies turn maneuver images 124. As further described below with respect to FIG. 2A, a first turn maneuver image 124 is identified to provide a perspective from an approach to the intersection 120 on the first navigable edge of the turn maneuver 122. Accordingly, the extraction module 114 can be configured to use the location metadata 112 to identify and select the first turn maneuver image, e.g., when a location of a camera reflects that the camera is located within, at, or closest to a predefined distance (e.g., fifteen meters) away from the intersection 120. Consequently, the first turn maneuver image 124 is captured by the camera when the camera is not located within the intersection 120. This first turn maneuver image 124 is important to determining whether a turn restriction is imposed on the turn maneuver 122 because if a turn restriction is imposed then transportation agencies and/or departments typically place a street-side sign that alerts drivers to the turn restriction as vehicles approach the intersection 120.

The extraction module 114 also identifies a second turn maneuver image 124 amongst the images 110 included in the map data 104. The second turn maneuver image 124 is identified to provide a perspective from within the intersection 120. Accordingly, the extraction module 114 is configured to again use the location metadata 112 to identify and select the second turn maneuver image 124, e.g., when a location of a camera is closest to a center of the intersection 120. This second turn maneuver image 124 is important to determining whether a turn restriction is imposed on the turn maneuver 122 because if a turn restriction is imposed then transportation agencies and/or departments typically place an additional sign that further alerts drivers to the turn restriction as the vehicle is entering and/or driving through the intersection 120.

After the extraction module 114 has identified the turn maneuver images 124, the extraction module 114 provides the turn maneuver images 124 to the recognition module 116. The recognition module 116 is configured to recognize signs 126 in turn maneuver images 124. In one example, the recognition module 116 is a computer vision machine learning model trained to implement a bounding box recognition approach that locates a portion of a turn maneuver image 124 that includes a sign 126 and then determines a type of the sign 126. The type of the sign 126 reflects the information the sign 126 is intending to convey to drivers. Accordingly, the bounding box recognition approach considers a shape of the sign 126, a color of the sign 126, a shape of a graphic illustrated on the sign 126, a color of a graphic illustrated on the sign 126, and/or word(s) written on the sign 126.

In one example, the signs 126 recognized by the recognition module 116 are meaningful signs. A meaningful sign is one that relates to traffic flow, which implies a potential relation to a turn restriction being imposed on the turn maneuver 122 at the intersection 120. In contrast, an example of an unmeaningful sign is a street name sign or a speed limit sign, and unmeaningful signs can be ignored by the recognition module 116. Stated alternatively, the recognition module 116 uses the unmeaningful signs to disambiguate from meaningful signs which are further processed, as described herein. In various examples, if no meaningful signs are recognized, then the system 102 predicts that the turn restriction is not imposed on the turn maneuver 122 and further processing is not needed.

The extraction module 114 is further configured to identify a number of "intersection" images 128 (e.g., one, two, three, four, five, ten) amongst the street-level images 110 included in the map data 104. An intersection image 128 is one that captures at least one of the signs 126 recognized in the turn maneuver images 124 from a different perspective (e.g., a different camera location). The extraction module 114 provides the intersection images 128 and/or the turn maneuver images 124 to the location module 118.

The location module 118 is configured to use the intersection images 128 and/or the turn maneuver images 124 to determine the locations and/or orientations 130 of the signs 126 recognized in the turn maneuver images 124. Accuracy in detecting the location and/or orientation 130 of a recognized sign 126, or any object in a three-dimensional space, improves when the recognized sign 126 is captured in images from different perspectives (e.g., different angles). Therefore, the intersection images 128 are used to more accurately locate and/or orient the recognized signs 126 with respect to a baseline location (e.g., the center of the intersection), as further described below with respect to FIG. 2B. Stated alternatively, the intersection images 128 provide an improved understanding of exactly how the recognized signs 126 are positioned with respect to the intersection 120 and/or the turn maneuver 122 being evaluated and analyzed.

After the recognition module 116 recognizes the signs 126 (e.g., the recognition reflects the types of signs and/or the information the sign is intending to convey to drivers) in the turn maneuver images 124, the recognition module 116 provides the recognized signs 126 as input parameters to a first machine learning model 132. The first machine learning model 132 is trained to determine (e.g., calculate) a score 134 for each sign 126 recognized in the turn maneuver images 124. The score 134 indicates a level of confidence that a corresponding sign 126 imposes the turn restriction on the turn maneuver 122 at the intersection 120. The scores 134 for the recognized signs 126 are the output parameters for the first machine learning model 132.

In one example, the first machine learning model 132 is trained to determine the score 134 for a sign 126 based on (i) a first prediction of whether the sign 126, when considered alone or by itself, imposes the turn restriction and (ii) a second prediction based on whether multiple signs (e.g., all the recognized signs 126 provides as input parameters), when considered as an aggregate, impose the turn restriction. Consequently, the first machine learning model 132 can be referred to as a two-stage model.

The first machine learning model 132 provides the scores 134 for the recognized signs 126 as input parameters to a second machine learning model 136. Accordingly, the separation of the first machine learning model 132 and the second machine learning model 136 provides a cascade, or pipeline, of machine learning models. The cascade of machine learning models is implemented to improve the accuracy at which turn restrictions can be identified. Accordingly, the second machine learning model 136 is configured to improve the accuracy of the scores 134 determined using the first machine learning model 132. In various examples, if the scores 134 output by the first machine learning model 132 are all below a score threshold such that the system 102 is confident in a prediction that the turn restriction is not imposed on the turn maneuver 122, then the process can stop and the second machine learning model 136 does not have to be executed. This can save computing resources.

To do this, the location module 118 provides the locations and/or orientations 130 of the recognized signs as additional input parameters to the second machine learning model 136. The second machine learning model 136 is trained to adjust (e.g., recalculate) the score 134 determined by the first machine learning model 132 for each sign 126 recognized in the turn maneuver images 124 based on the location and/or the orientation 130 of the sign 126. The adjustments produce adjusted scores 138, as shown in FIG. 1. The second machine learning model 136 is further trained to predict, based on the adjusted scores 138, whether the turn restriction is imposed on the turn maneuver 122 at the intersection 120. The prediction 140 is the output parameter for the second machine learning model 138. In various examples, the prediction 140 can be used to automatically update the map data 104 to indicate whether or not a turn restriction is imposed on the turn maneuver 122. Furthermore, the updated map data 104, which indicates that the turn restriction is imposed on the turn maneuver 122, can be provided to (e.g., downloaded by) an available device (e.g., a smart phone, a vehicle console device) in association with turn-by-turn directions from an original location to a destination location.

Similar to the discussion above with respect to the first machine learning model 132, the second machine learning model 136 can be trained to adjust the score 134 for a sign 126 based on (i) a first prediction of whether the location and/or the orientation 130 of the sign 126, when considered alone or by itself, imposes the turn restriction and (ii) a second prediction based on whether the locations and/or the orientations 130 of multiple signs (e.g., all the recognized signs 126), when considered as an aggregate, impose the turn restriction. Consequently, the second machine learning model 136 can also be referred to as a two-stage model.

The first machine learning model 132 and/or the second machine learning model 136 can be any one of various predictive models. In one example, the first machine learning model 132 and/or the second machine learning model 136 is a gradient-boosted decision tree (GBDT) model. Alternatively, the first machine learning model 132 and/or the second machine learning model 136 can use any one of neural networks (e.g., convolutional neural networks, recurrent neural networks such as Long Short-Term TRansformer, etc.), Naïve Bayes, k-nearest neighbor algorithm, majority classifier, support vector machines, random forests, boosted trees, Classification and Regression Trees (CART), and so on.

Figure 2A:
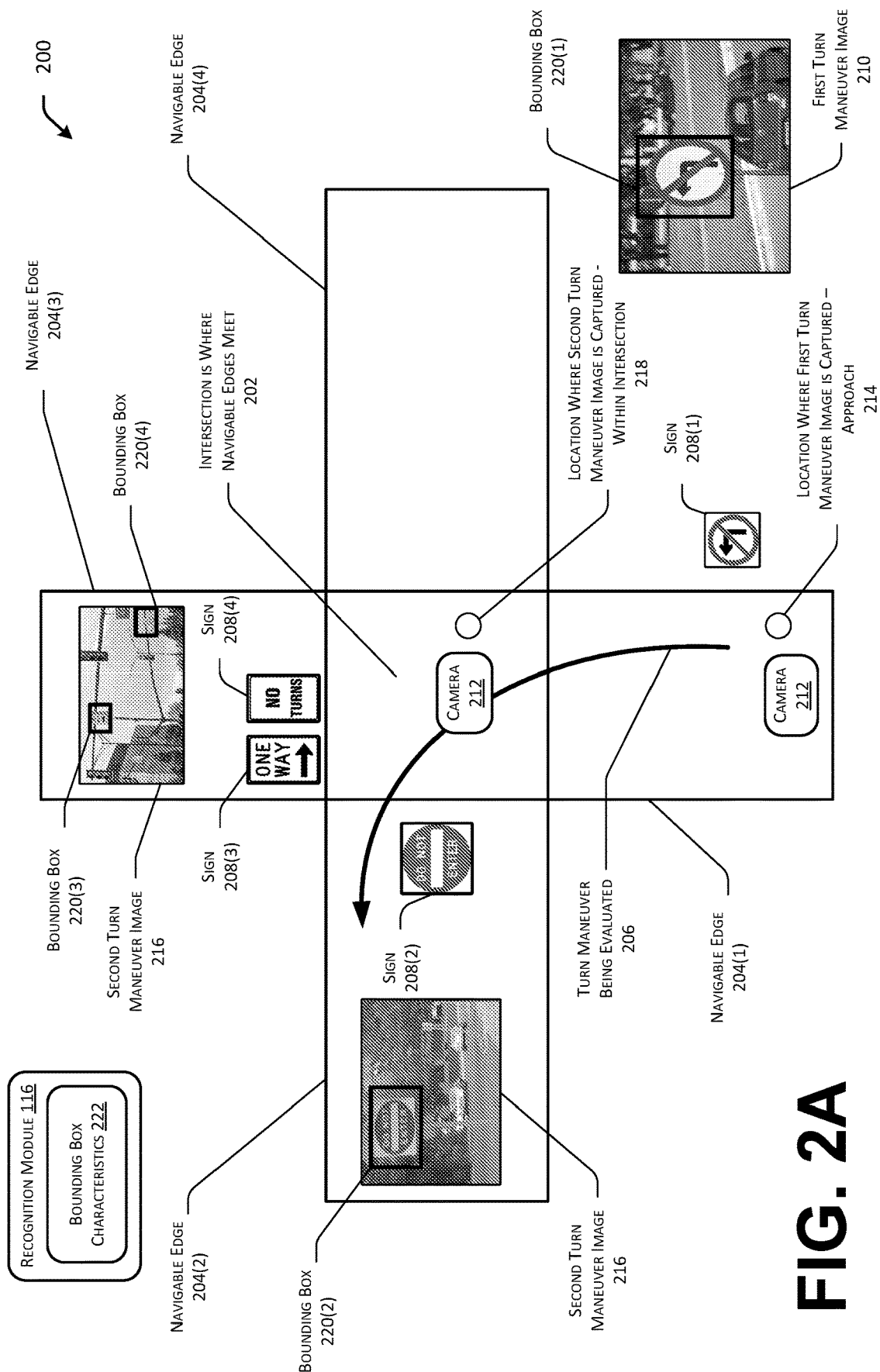
FIG. 2A illustrates an example diagram that captures an example scenario where map data can be mined to determine, or predict, if a turn restriction is imposed on a defined turn maneuver at an identified intersection.

FIG. 2A illustrates an example diagram 200 that captures an example scenario where map data can be mined to determine, or predict, if a turn restriction is imposed on a defined turn maneuver at an identified intersection. FIG. 2A illustrates an intersection 202 where four navigable edges 204(1-4) meet. Moreover, FIG. 2A illustrates a defined turn maneuver 206 for evaluation and/or analysis. The defined turn maneuver 206 is being evaluated to determine whether a turn from the navigable edge 204(1) onto the navigable edge 204(2) is restricted. As shown, a transportation department and/or agency has placed various signs 208(1-4) for drivers approaching and/or driving through the intersection 202. The number of signs can vary from one intersection to the next and/or for one turn maneuver to the next. Thus, while the example of FIG. 2A illustrates four signs, it is understood that more or less signs can be posted.

The sign 208(1) is included in a first turn maneuver image 210 captured when a camera 212 is at a first location 214. The first turn maneuver image 210 is identified to provide a perspective from an approach to the intersection 202 on the first navigable edge 204(1) of the turn maneuver 206. The first turn maneuver image 210 can be identified and/or selected based on a location 214 of the camera 212 being within, at, or closest to a predefined distance (e.g., fifteen meters) away from a center of the intersection 202. Consequently, the first turn maneuver image 210 is captured by the camera 212 when the camera is not located within the intersection 202.

The signs 208(2-4) are included in a second turn maneuver image 216 captured when the camera 212 is at a second location 218. Note that in a situation where the camera 212 is a 360 degree camera the second turn maneuver image 216 can capture imagery in different directions (e.g., to the top or north in FIG. 2A as well as to the left or west in FIG. 2A). The second turn maneuver image 216 is identified to provide a perspective from within the intersection 202. Accordingly, the second turn maneuver image 216 can be identified and/or selected based on a location 218 of the camera 212 being at or closest to a center of the intersection 202.

FIG. 2A further illustrates the recognition module 116 that is trained to implement a bounding box recognition approach that locates the portions of the turn maneuver images 210, 216 that include the signs 208(1-4). As shown, the recognition module 116 locates sign 208(1) in the first turn maneuver image 210 using bounding box 220(1). The recognition module 116 locates sign 208(2) in the second turn maneuver image 216 using bounding box 220(2). The recognition module 116 locates signs 208(3) and 208(4) in the other second turn maneuver image 216 using bounding boxes 220(3) and 220(4).

The recognition module 116 uses the bounding boxes 220(1-4) to perform image analysis and recognize the types of the signs 208(1-4). A type of a sign reflects the information the sign is intending to convey to drivers. The bounding box recognition approach considers characteristics 222 of the sign such as a shape of the sign, a color of the sign, a shape of a graphic illustrated on the sign, a color of a graphic illustrated on the sign, and/or word(s) written on the sign. The characteristics 222 of different signs are often consistent across different geographic regions, which makes the recognition more accurate and reliable.

In the example of FIG. 2A, the recognition module 116 uses the bounding box 220(1) for the first turn maneuver image 210 to recognize that sign 208(1) is intended to communicate, via an illustration (e.g., a black turn arrow surrounded by a red circle with a red diagonal line through the middle) that a left turn is restricted. The recognition module 116 uses the bounding box 220(2) for the second turn maneuver image 216 to recognize that sign 208(2) is intended to communicate, via an illustration and words (e.g., a red circle with "Do Not Enter" inside), that vehicles are restricted from entering the navigable edge 204(2) from the intersection. The recognition module 116 uses the bounding box 220(3) for the second turn maneuver image 216 to recognize that sign 208(3) is intended to communicate, via an illustration and words (e.g., a black arrow with the words "One Way" above), that the street associated with navigable edges 204(2) and 204(4) is a one way street and vehicles must therefore travel in the direction from left to right (e.g., west to east) and not in the direction from right to left (e.g., east to west). The recognition module 116 uses the bounding box 220(4) for the second turn maneuver image 216 to recognize that sign 208(4) is intended to communicate, via words (e.g., "No Turns"), that vehicles approaching the intersection 202 on navigable edge 204(1) must drive straight through the intersection and onto navigable edge 204(3) (i.e., no turns onto navigable edges 204(2) or 204(4) are allowed).

Figure 2B:
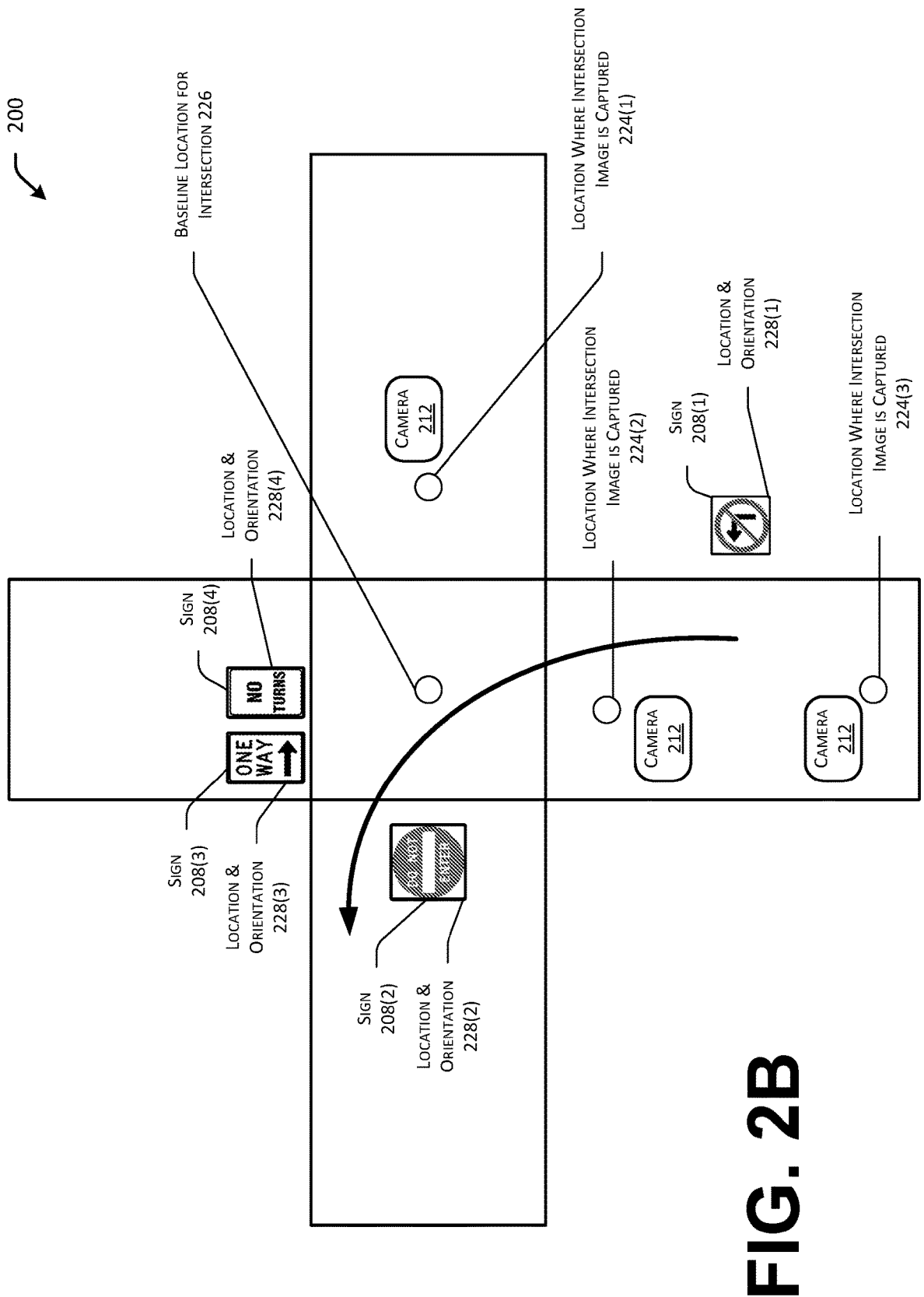
FIG. 2B illustrates the example diagram of FIG. 2A, where intersection images are mined to improve the prediction of whether the turn restriction is imposed on the defined turn maneuver at the identified intersection.

FIG. 2B illustrates the example diagram of FIG. 2A, where intersection images are mined to improve the prediction of whether the turn restriction is imposed on the defined turn maneuver at the identified intersection. FIG. 2B illustrates locations 224(1-3) of the camera 212 when additional "intersection" images are captured. As described above, an intersection image is one that captures at least one of the signs 208(1-4) from a different perspective (e.g., a different camera location). As shown in FIG. 2B, the images captured at locations 224(1) and 224(2) capture the signs 208(2-4) from a different perspective compared to the location 218 of the camera 212 in FIG. 2A. Similarly, the image captured at location 224(3) captures the sign 208(1) from a different perspective compared to the location 214 of the camera 212 in FIG. 2A (e.g., the location 224(3) is further away from the intersection 202 compared to location 214).

The location module 118 is configured to use the intersection images 128 and/or the turn maneuver images 124 (e.g., turn maneuver images 210 and 216) to determine the locations and/or orientations 130 of the signs 208(1-4). Accuracy in detecting the locations and/or orientations 130 of the signs 208(1-4) improves when the signs 208(1-4) are captured in images from different perspectives (e.g., different angles). Therefore, the intersection images 128 are used to more accurately locate and/or orient the signs 208(1-4) with respect to a baseline location 226 (e.g., the center of the intersection). Stated alternatively, the intersection images 128 provide an improved understanding of exactly how the signs 208(1-4) are positioned with respect to the intersection 202 and/or the turn maneuver 204 being evaluated and/or analyzed.

As illustrated in FIG. 2B, a first location and/or orientation 228(1) is determined relative to the baseline location 226 for the sign 208(1). A second location and/or orientation 228(2) is determined relative to the baseline location 226 for the sign 208(2). A third location and/or orientation 228(3) is determined relative to the baseline location 226 for the sign 208(3). And, a fourth location and/or orientation 228(4) is determined relative to the baseline location 226 for the sign 208(4). While the number of intersection images described with respect to FIG. 2B is three, it is understood that a different number of intersection images can be identified and used, noting that the determined location and/or orientation of a sign cam be more accurate as the number of images that capture the same sign increases.

In one example, the location module 118 uses a computer vision (CV) model to identify and locate common (e.g., aligned) points on a recognized sign 126 from various images. A common point on a recognized sign is determined based on an intersection of trajectories (e.g., light rays) projected onto image planes. More specifically, the common point is projected onto respective image planes through the cameras' focal points resulting in separate points on the respective image planes. Since the geometry (e.g., locations and/or orientations) of the cameras is known, the trajectories that intersect at the common point can be determined and linear algebra can be used to accurately calculate the location and/or the orientation of a common point on the recognized sign in the real world. By association, the location and/or orientation of the recognized sign can be determined. In various examples, the location and/or orientation of the recognized sign is transformed into a format that is relative to the baseline location 226 associated with the intersection (e.g., a vector that captures a distance from the baseline location and an angle—or azimuth—based on a spherical coordinate system established based on the baseline location). In this context, the baseline location and/or the camera locations are included in the map data 104 and can be GPS coordinates, for example.

While the camera 212 illustrated in FIG. 2A and FIG. 2B may be the same camera (e.g., a 360 degree panoramic camera fixed on top of a vehicle tasked with driving around a geographic region to generate the street-level imagery), it is understood that different cameras can be used to capture the first turn maneuver image, the second turn maneuver image, and/or the intersection images.

Figure 3:
FIG. 3 illustrates an example set of predefined signs the system is configured to recognize.

FIG. 3 illustrates an example set 300 of meaningful signs the recognition module 116 is configured to recognize. A meaningful sign is one that relates to traffic flow, which implies a potential relation to, or indication of, a turn restriction being imposed on the turn maneuver 122 at the intersection 120. The individual signs in the example set 300 can be related to, or indicative of, a turn restriction to varying degrees. In contrast, an example of an unmeaningful sign is a street name sign or a speed limit sign, and unmeaningful signs can be ignored. Stated alternatively, unmeaningful signs are not recognized and thus disambiguate from meaningful signs which should be used in the cascade of machine learning models. Accordingly, the recognition of signs posted within or near the intersection can be limited to a set of predefined signs such as the one illustrated in FIG. 3.

Figure 4:
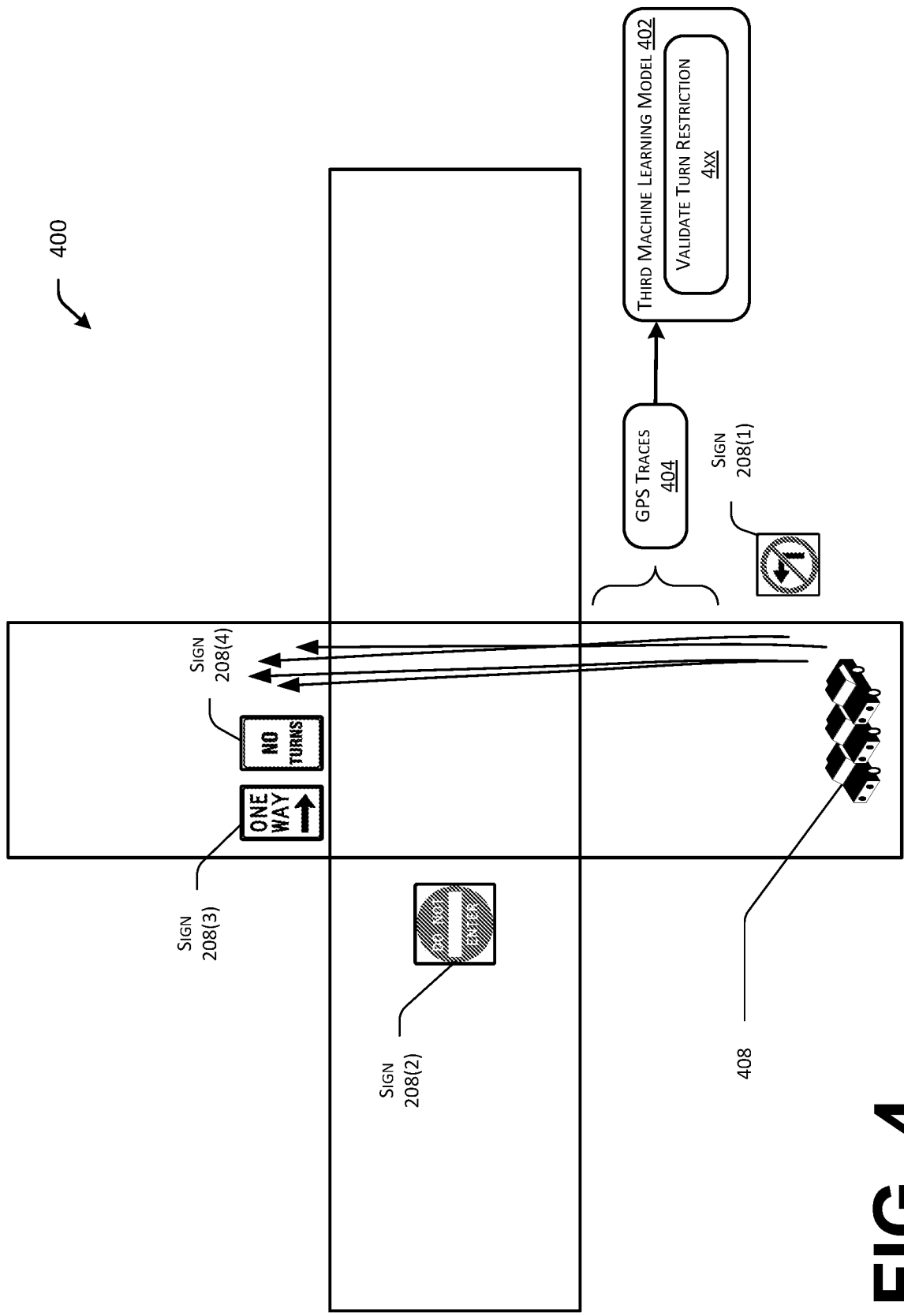
FIG. 4 illustrates the example diagram of FIG. 2A and FIG. 2B, from which Global Positioning System (GPS) traces of vehicles can be obtained and used to validate the prediction of whether a turn restriction is imposed on a turn maneuver.

FIG. 4 illustrates the example diagram of FIG. 2A and FIG. 2B, from which Global Positioning System (GPS) traces of vehicles can be obtained and used to validate the prediction 140 of whether a turn restriction is imposed on a turn maneuver 122. As illustrated, the system 102 can include a third machine learning model 402 (e.g., a GBDT model) configured to receive GPS traces 404. In one example, the GPS traces are part of the map data. In another example, the GPS traces come from another data source.

The GPS traces 404 capture the maneuvers performed by a large number of vehicles 408 (e.g., hundreds, thousands, millions) that drive through the intersection 202. The GPS traces 404 illustrate that all or most of the vehicles 408 go straight through the intersection. Thus, the GPS traces 404 can be used to validate the previous prediction that the turn restriction is imposed. In contrast, if the GPS traces 404 indicate that a certain percentage (e.g., over 10%) of vehicles 408 perform the turn maneuver, then third machine learning model 402 can invalidate the previous prediction that the turn restriction is imposed.

Figure 5A:
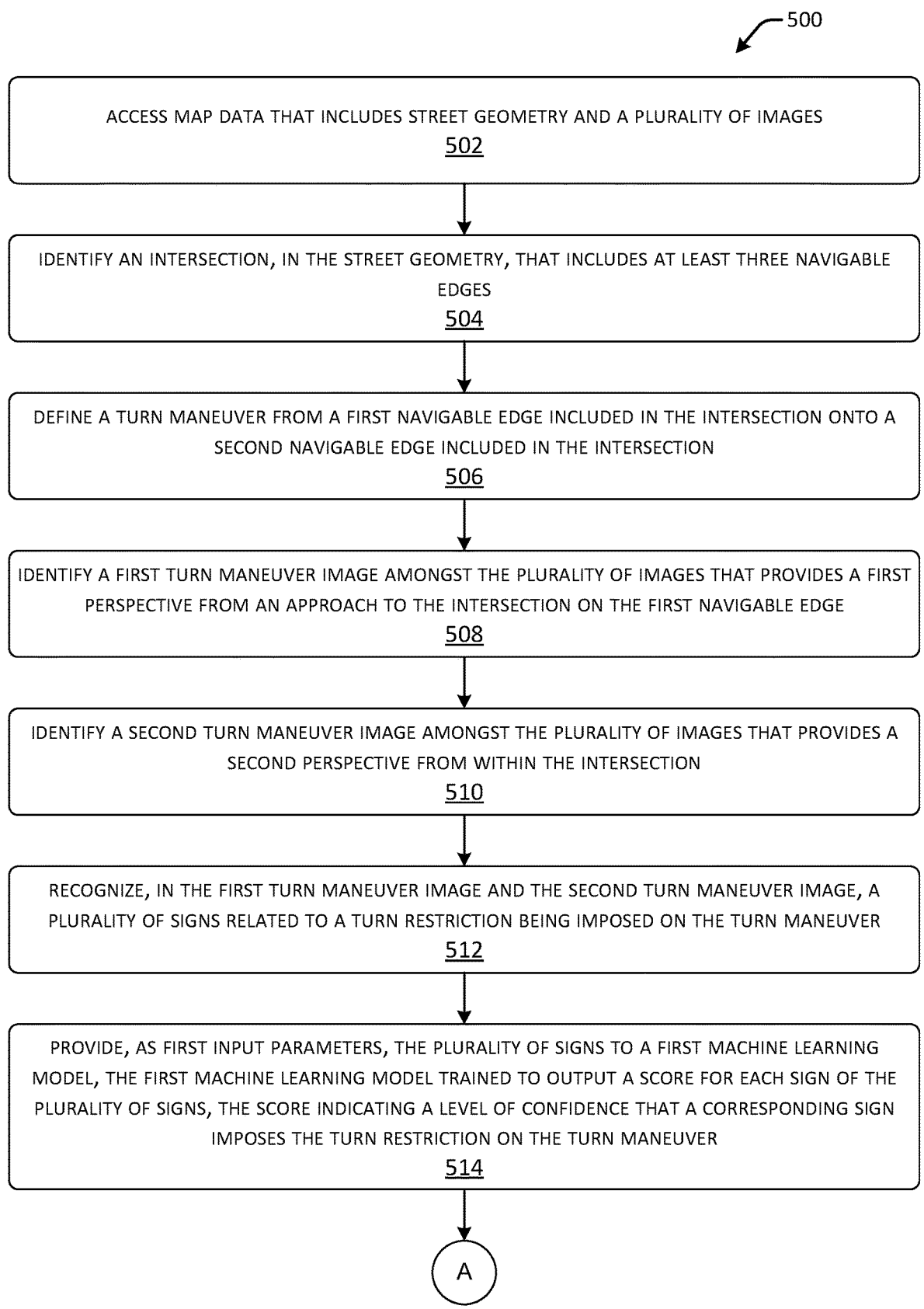
FIGS. 5A-5B illustrate an example flow diagram of an example method for mining map data to automatically identify and/or predict turn restrictions.
Figure 5B:
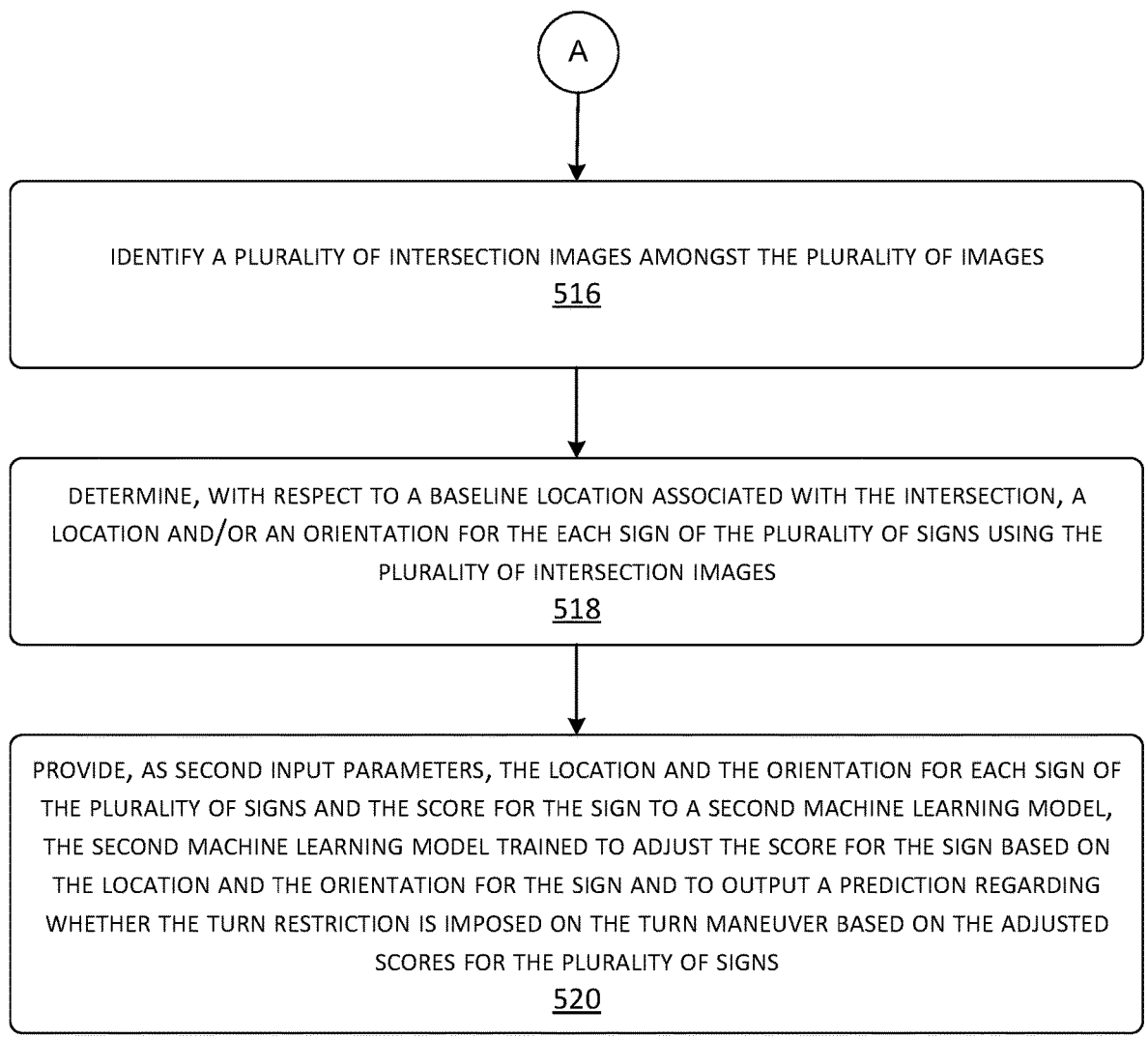

FIGS. 5A-5B represent an example process in accordance with various examples from the description of FIGS. 1-4. The example operations shown in FIGS. 5A-5B can be implemented on or otherwise embodied in one or more device(s) of the system 102.

The order in which the operations are described is not intended to be construed as a limitation, and any number of the described operations can be combined in any order and/or in parallel to implement each process. Moreover, the operations in FIGS. 5A-5B can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable storage media and executed by at least one processing unit to perform the described operations.

FIGS. 5A-5B illustrate a flow diagram of an example method 500 for mining map data to automatically identify and/or predict turn restrictions.

At operation 502, map data that includes street geometry and a plurality of images is accessed. At operation 504, an intersection that includes at least three navigable edges is identified din the street geometry.

At operation 506, a turn maneuver from a first navigable edge included in the intersection onto a second navigable edge included in the intersection is defined. At operation 508, a first turn maneuver image amongst the plurality of images is identified. The first turn maneuver image provides a first perspective from an approach to the intersection on the first navigable edge. At operation 510, a second turn maneuver image amongst the plurality of images is identified. The second turn maneuver image provides a second perspective from within the intersection.

At operation 512, a plurality of signs is recognized in the first turn maneuver image and the second turn maneuver image. As described above, each of the plurality of signs is related to the turn restriction being imposed on the turn maneuver.

At operation 514, the plurality of signs is provided, as first input parameters, to a first machine learning model. The first machine learning model is trained to output a score for each sign of the plurality of signs, the score indicating a level of confidence that a corresponding sign imposes the turn restriction on the turn maneuver.

Following the connection labeled A from FIG. 5A to FIG. 5B, operation 516 identifies a plurality of intersection images amongst the plurality of images. At operation 518, a location for the each sign of the plurality of signs is determined, with respect to a baseline location associated with the intersection, using the plurality of intersection images.

At operation 520, the location for each sign of the plurality of signs and the score for the sign is provided, as second input parameters, to a second machine learning model. The second machine learning model is trained to adjust the score for the sign based on the location for the sign. Moreover, the second machine learning model is configured to output a prediction regarding whether the turn restriction is imposed on the turn maneuver based on the adjusted scores for the plurality of signs.

Figure 6:
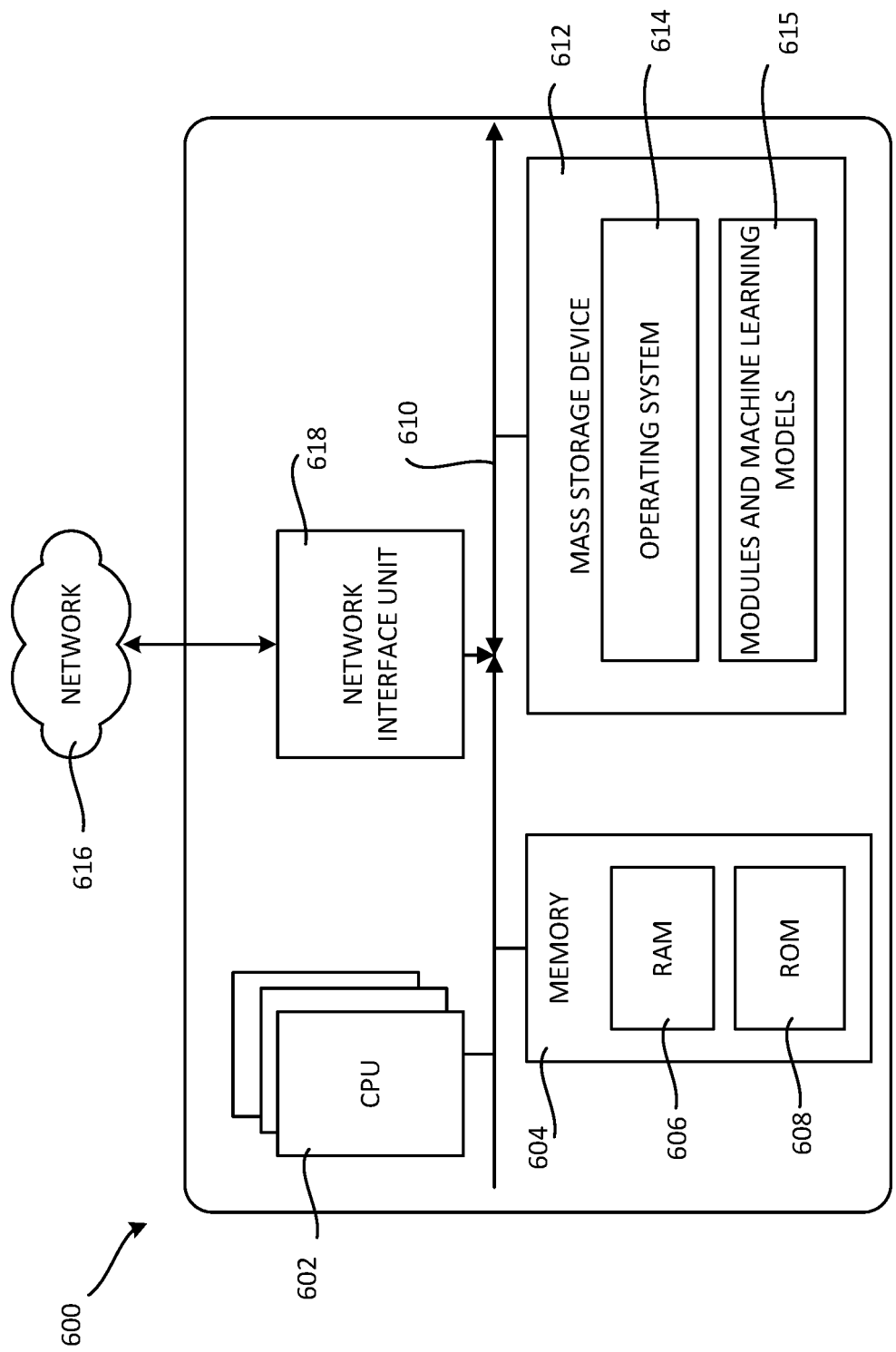
FIG. 6 is an example computer architecture diagram illustrating an illustrative computer hardware and software architecture for a computing system capable of implementing aspects of the techniques and technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server or other type of computing device capable of implementing the system 102 in FIG. 1.

The computing device 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computing device 600, such as during startup, can be stored in the ROM 608. The computing device 600 further includes a mass storage device 612 for storing an operating system 614, application programs, and/or other types of programs. The mass storage device 612 can also be configured to store other types of data and components, such as the modules and machine learning models 615 illustrated in FIG. 1.

The mass storage device 612 is connected to the CPU 602 through a mass storage controller connected to the bus 610. The mass storage device 612 and its associated computer readable media provide non-volatile storage for the computing device 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 600. For purposes of the claims, the phrase "computer storage medium," and variations thereof, does not include waves or signals per se or communication media.

According to various configurations, the computing device 600 can operate in a networked environment using logical connections to remote computers through a network such as the network 616. The computing device 600 can connect to the network 616 through a network interface unit 618 connected to the bus 610. It should be appreciated that the network interface unit 618 can also be utilized to connect to other types of networks and remote computer systems.

It should be appreciated that the software components described herein, when loaded into the CPU 602 and executed, can transform the CPU 602 and the overall computing device 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

The disclosure presented herein also encompasses the subject matter set forth in the following clauses.

Example Clause A, a method for mining map data to automatically predict a turn restriction, the method comprising: accessing, by at least one processing unit, the map data that includes street geometry and a plurality of images; identifying an intersection, in the street geometry, that includes at least three navigable edges; defining a turn maneuver from a first navigable edge included in the intersection onto a second navigable edge included in the intersection; identifying a first turn maneuver image amongst the plurality of images that provides a first perspective from an approach to the intersection on the first navigable edge; identifying a second turn maneuver image amongst the plurality of images that provides a second perspective from within the intersection; recognizing, in the first turn maneuver image and the second turn maneuver image, a plurality of signs related to the turn restriction being imposed on the turn maneuver; providing, as first input parameters, the plurality of signs to a first machine learning model, the first machine learning model trained to output a score for each sign of the plurality of signs, the score indicating a level of confidence that a corresponding sign imposes the turn restriction on the turn maneuver; identifying a plurality of intersection images amongst the plurality of images; determining, with respect to a baseline location associated with the intersection, a location for the each sign of the plurality of signs using the plurality of intersection images; and providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

Example Clause B, the method of Example Clause A, wherein the first machine learning model comprises a first gradient-boosted decision tree (GBDT) model and the second machine learning model comprises a second GBDT model.

Example Clause C, the method of Example Clause B, wherein the first GBDT model is trained to determine the score for each sign of the plurality of signs based on: a first prediction of whether the sign, when considered alone, imposes the turn restriction; and a second prediction based on whether the plurality of signs, when considered as an aggregate, impose the turn restriction.

Example Clause D, the method of Example Clause B or Example Clause C, wherein the second GBDT model is trained to adjust the score based on: a first prediction of whether the location of an individual sign, when considered alone, imposes the turn restriction; and a second prediction based on whether the locations of the plurality of signs, when considered as an aggregate, impose the turn restriction.

Example Clause E, the method of any one of Example Clauses A through D, further comprising: accessing Global Positioning System (GPS) traces from vehicles that drive through the intersection; and validating the prediction of whether the turn restriction is imposed based on the GPS traces.

Example Clause F, the method of any one of Example Clauses A through E, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

Example Clause G, the method of any one of Example Clauses A through F, wherein determining the location for each sign of the plurality of signs comprises: identifying a common point on the sign for at least two images; and using camera geometry and linear algebra to determine the location for the sign.

Example Clause H, the method of any one of Example Clauses A through G, wherein recognizing the plurality of signs related to the turn restriction being imposed on the turn maneuver is limited to a set of predefined signs such that other signs not included in the set of predefined signs are not recognized.

Example Clause I, the method of any one of Example Clauses A through H, further comprising updating the map data with the prediction regarding whether the turn restriction is imposed on the turn maneuver.

Example Clause J, a system for mining map data to automatically predict a turn restriction, the system comprising: a processing unit; and a computer-readable storage medium having computer-executable instructions stored thereupon, which, when executed by the processing unit, cause the processing unit to perform operations comprising: accessing the map data that includes street geometry and a plurality of images; identifying an intersection, in the street geometry, that includes at least three navigable edges; defining a turn maneuver from a first navigable edge included in the intersection onto a second navigable edge included in the intersection; identifying a first turn maneuver image amongst the plurality of images that provides a first perspective from an approach to the intersection on the first navigable edge; identifying a second turn maneuver image amongst the plurality of images that provides a second perspective from within the intersection; recognizing, in the first turn maneuver image and the second turn maneuver image, a plurality of signs related to the turn restriction being imposed on the turn maneuver; providing, as first input parameters, the plurality of signs to a first machine learning model, the first machine learning model trained to output a score for each sign of the plurality of signs, the score indicating a level of confidence that a corresponding sign imposes the turn restriction on the turn maneuver; identifying a plurality of intersection images amongst the plurality of images; determining, with respect to a baseline location associated with the intersection, a location for the each sign of the plurality of signs using the plurality of intersection images; and providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

Example Clause K, the system of Example Clause J, wherein the first machine learning model comprises a first gradient-boosted decision tree (GBDT) model and the second machine learning model comprises a second GBDT model.

Example Clause L, the system of Example Clause K, wherein the first GBDT model is trained to determine the score for each sign of the plurality of signs based on: a first prediction of whether the sign, when considered alone, imposes the turn restriction; and a second prediction based on whether the plurality of signs, when considered as an aggregate, impose the turn restriction.

Example Clause M, the system of Example Clause K or Example Clause L, wherein the second GBDT model is trained to adjust the score based on: a first prediction of whether the location of an individual sign, when considered alone, imposes the turn restriction; and a second prediction based on whether the locations of the plurality of signs, when considered as an aggregate, impose the turn restriction.

Example Clause N, the system of any one of Example Clauses J through M, wherein the operations further comprise: accessing Global Positioning System (GPS) traces from vehicles that drive through the intersection; and validating the prediction of whether the turn restriction is imposed based on the GPS traces.

Example Clause O, the system of any one of Example Clauses J through N, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

Example Clause P, the system of any one of Example Clauses J through O, wherein determining the location for each sign of the plurality of signs comprises: identifying a common point on the sign for at least two images; and using camera geometry and linear algebra to determine the location for the sign.

Example Clause Q, a computer-readable storage medium having computer-executable instructions stored thereupon, which, when executed by a processing unit, cause the processing unit to perform operations comprising: accessing the map data that includes street geometry and a plurality of images; identifying an intersection, in the street geometry, that includes at least three navigable edges; defining a turn maneuver from a first navigable edge included in the intersection onto a second navigable edge included in the intersection; identifying a first turn maneuver image amongst the plurality of images that provides a first perspective from an approach to the intersection on the first navigable edge; identifying a second turn maneuver image amongst the plurality of images that provides a second perspective from within the intersection; recognizing, in the first turn maneuver image and the second turn maneuver image, a plurality of signs related to the turn restriction being imposed on the turn maneuver; providing, as first input parameters, the plurality of signs to a first machine learning model, the first machine learning model trained to output a score for each sign of the plurality of signs, the score indicating a level of confidence that a corresponding sign imposes the turn restriction on the turn maneuver; identifying a plurality of intersection images amongst the plurality of images; determining, with respect to a baseline location associated with the intersection, a location for the each sign of the plurality of signs using the plurality of intersection images; and providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

Example Clause R, the computer-readable storage medium of Example Clause Q, wherein the operations further comprise: accessing Global Positioning System (GPS) traces from vehicles that drive through the intersection; and validating the prediction of whether the turn restriction is imposed based on the GPS traces.

Example Clause S, the computer-readable storage medium of Example Clause Q or Example Clause R, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

Example Clause T, the computer-readable storage medium of any one of Example Clauses Q through S, wherein recognizing the plurality of signs related to the turn restriction being imposed on the turn maneuver is limited to a set of predefined signs such that other signs not included in the set of predefined signs are not recognized.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different images, two different signs, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method for mining map data to automatically predict a turn restriction, the method comprising:
   accessing, by at least one processing unit, the map data that includes street geometry and a plurality of images;
   identifying an intersection, in the street geometry, that includes at least three navigable edges;
   defining a turn maneuver from a first navigable edge included in the intersection onto a second navigable edge included in the intersection;
   identifying a first turn maneuver image amongst the plurality of images that provides a first perspective from an approach to the intersection on the first navigable edge;
   identifying a second turn maneuver image amongst the plurality of images that provides a second perspective from within the intersection;
   recognizing, in the first turn maneuver image and the second turn maneuver image, a plurality of signs related to the turn restriction being imposed on the turn maneuver;
   providing, as first input parameters, the plurality of signs to a first machine learning model, the first machine learning model trained to output a score for each sign of the plurality of signs, the score indicating a level of confidence that a corresponding sign imposes the turn restriction on the turn maneuver;
   identifying a plurality of intersection images amongst the plurality of images;
   determining, with respect to a baseline location associated with the intersection, a location for each sign of the plurality of signs using the plurality of intersection images; and
   providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

2. The method of claim 1, wherein the first machine learning model comprises a first gradient-boosted decision tree (GBDT) model and the second machine learning model comprises a second GBDT model.

3. The method of claim 2, wherein the first GBDT model is trained to determine the score for each sign of the plurality of signs based on:
   a first prediction of whether the sign, when considered alone, imposes the turn restriction; and
   a second prediction based on whether the plurality of signs, when considered as an aggregate, impose the turn restriction.

4. The method of claim 2, wherein the second GBDT model is trained to adjust the score based on:
   a first prediction of whether the location of an individual sign, when considered alone, imposes the turn restriction; and
   a second prediction based on whether the locations of the plurality of signs, when considered as an aggregate, impose the turn restriction.

5. The method of claim 1, further comprising:
   accessing Global Positioning System (GPS) traces from vehicles that drive through the intersection; and
   validating the prediction of whether the turn restriction is imposed based on the GPS traces.

6. The method of claim 1, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

7. The method of claim 1, wherein determining the location for each sign of the plurality of signs comprises:
   identifying a common point on the sign for at least two images; and
   using camera geometry and linear algebra to determine the location for the sign.

8. The method of claim 1, wherein recognizing the plurality of signs related to the turn restriction being imposed on the turn maneuver is limited to a set of predefined signs such that other signs not included in the set of predefined signs are not recognized.

9. The method of claim 1, further comprising updating the map data with the prediction regarding whether the turn restriction is imposed on the turn maneuver.

10. A system for mining map data to automatically predict a turn restriction, the system comprising:
    a processing unit; and
    a computer-readable storage medium having computer-executable instructions stored thereupon, which, when executed by the processing unit, cause the processing unit to perform operations comprising:
      accessing the map data that includes street geometry and a plurality of images;
      identifying an intersection, in the street geometry, that includes at least three navigable edges;
      defining a turn maneuver from a first navigable edge included in the intersection onto a second navigable edge included in the intersection;

identifying a first turn maneuver image amongst the plurality of images that provides a first perspective from an approach to the intersection on the first navigable edge;

identifying a second turn maneuver image amongst the plurality of images that provides a second perspective from within the intersection;

recognizing, in the first turn maneuver image and the second turn maneuver image, a plurality of signs related to the turn restriction being imposed on the turn maneuver;

providing, as first input parameters, the plurality of signs to a first machine learning model, the first machine learning model trained to output a score for each sign of the plurality of signs, the score indicating a level of confidence that a corresponding sign imposes the turn restriction on the turn maneuver;

identifying a plurality of intersection images amongst the plurality of images;

determining, with respect to a baseline location associated with the intersection, a location for each sign of the plurality of signs using the plurality of intersection images; and providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

11. The system of claim 10, wherein the first machine learning model comprises a first gradient-boosted decision tree (GBDT) model and the second machine learning model comprises a second GBDT model.

12. The system of claim 11, wherein the first GBDT model is trained to determine the score for each sign of the plurality of signs based on:
a first prediction of whether the sign, when considered alone, imposes the turn restriction; and
a second prediction based on whether the plurality of signs, when considered as an aggregate, impose the turn restriction.

13. The system of claim 11, wherein the second GBDT model is trained to adjust the score based on:
a first prediction of whether the location of an individual sign, when considered alone, imposes the turn restriction; and
a second prediction based on whether the locations of the plurality of signs, when considered as an aggregate, impose the turn restriction.

14. The system of claim 10, wherein the operations further comprise:
accessing Global Positioning System (GPS) traces from vehicles that drive through the intersection; and
validating the prediction of whether the turn restriction is imposed based on the GPS traces.

15. The system of claim 10, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

16. The system of claim 10, wherein determining the location for each sign of the plurality of signs comprises:
identifying a common point on the sign for at least two images; and
using camera geometry and linear algebra to determine the location for the sign.

17. A computer-readable storage medium having computer-executable instructions stored thereupon, which, when executed by a processing unit, cause the processing unit to perform operations comprising:
accessing the map data that includes street geometry and a plurality of images;
identifying an intersection, in the street geometry, that includes at least three navigable edges;
defining a turn maneuver from a first navigable edge included in the intersection onto a second navigable edge included in the intersection;
identifying a first turn maneuver image amongst the plurality of images that provides a first perspective from an approach to the intersection on the first navigable edge;
identifying a second turn maneuver image amongst the plurality of images that provides a second perspective from within the intersection;
recognizing, in the first turn maneuver image and the second turn maneuver image, a plurality of signs related to the turn restriction being imposed on the turn maneuver;
providing, as first input parameters, the plurality of signs to a first machine learning model, the first machine learning model trained to output a score for each sign of the plurality of signs, the score indicating a level of confidence that a corresponding sign imposes the turn restriction on the turn maneuver;
identifying a plurality of intersection images amongst the plurality of images;
determining, with respect to a baseline location associated with the intersection, a location for each sign of the plurality of signs using the plurality of intersection images; and
providing, as second input parameters, the location for each sign of the plurality of signs and the score for the sign to a second machine learning model, the second machine learning model trained to adjust the score for the sign based on the location for the sign and to output a prediction regarding whether the turn restriction is imposed on the turn maneuver based on the adjusted scores for the plurality of signs.

18. The computer-readable storage medium of claim 17, wherein the operations further comprise:
accessing Global Positioning System (GPS) traces from vehicles that drive through the intersection; and
validating the prediction of whether the turn restriction is imposed based on the GPS traces.

19. The computer-readable storage medium of claim 17, wherein recognizing the plurality of signs related to the turn restriction being imposed on the turn maneuver comprises implementing bounding box recognition that identifies a portion of an image that contains a sign and considers at least one of: a shape of the sign, a color of the sign, a shape of a graphic illustrated on the sign, a color of a graphic illustrated on the sign, or a word written on the sign.

20. The computer-readable storage medium of claim 17, wherein recognizing the plurality of signs related to the turn restriction being imposed on the turn maneuver is limited to a set of predefined signs such that other signs not included in the set of predefined signs are not recognized.

* * * * *